UNITED STATES PATENT OFFICE

2,447,981
ANTHRAQUINONE VAT DYESTUFFS

Francis Irving and Alistair Livingston, Blackley, Manchester, England, assignors to Imperial Chemical Industries Limited, a corporation of Great Britain No Drawing. Application October 9, 1946, Serial No. 702,092. In Great Britain October 18, 1945

2 Claims. (Cl. 260—368)

This invention relates to new vat dyestuffs and more particularly it relates to new reddish-violet vat dyestuffs of the anthraquinone series.

In U. S. Patent 1,539,689 it has already been proposed to manufacture vat dyestuffs by condensing together an aminoanthraquinone or a derivative thereof and a 1-aminoanthraquinone-2-carboxylic acid or its chloride.

In the previously described process it has not been proposed to use, as aminoanthraquinone, 5-amino-1:4-diaroylaminoanthraquinones.

We have now found that when in the above process there is used, as aminoanthraquinone, 5-amino-1:4-diaroylaminoanthraquinone there are obtained vat dyestuffs which dye cotton in Bordeaux shades of greater brilliance and tinctorial power than those of similar shade described in the aforementioned specification.

Accordingly our invention provides a process for the manufacture of new vat dyestuffs which comprises acylating a 5-amino-1:4-diaroylaminoanthraquinone with an acylating derivative of an anthraquinone-2-carboxylic acid which carries in the 1-position an amino group or an atom or group readily convertible thereto.

The new dyestuffs are thus compounds of the formula

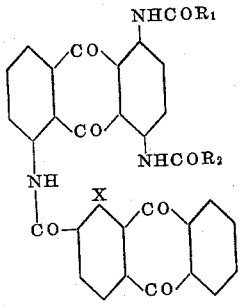

where $R_1$ and $R_2$ are aryl groups and X is an amino group or an atom or group readily convertible thereto.

As 5-amino-1:4-diaroylaminoanthraquinones there may be used for example 5-amino-1:4-dibenzoylaminoanthraquinone, 5-amino-1:4-di-p-methanesulphonylbenzoylaminoanthraquinone, 5 - amino - 1:4 - dianisylaminoanthraquinone, 5-amino -1:4 - di - p - toluylaminoanthraquinone, 5 - amino - 1:4 - di-m-methanesulphonylbenzoylaminoanthraquinone and 5-amino-1:4-di-p-chlorobenzoylaminoanthraquinone.

These substances may be made by the method described in British specification No. 421,591.

As anthraquinone 2-carboxylic acids there may be used for example 1-nitroanthraquinone-2-carboxylic acid, 1-aminoanthraquinone-2-carboxylic acid and 1-chloroanthraquinone-2-carboxylic acid, and as acylating derivatives thereof there may be used for example the acid chlorides.

It is a further feature of the invention, when the anthraquinone-2-carboxylic acid contains, not an amino group but a group readily convertible thereto, to convert the said group to an amino group after the acylation step. This may be effected by known processes. Thus when the said group is a nitro group it may be reduced to an amino group. It is not always necessary to bring about this change separately since the vatting process commonly effects this reduction. Besides reduction the nitro group may be converted into an amino group by treatment with ammonia as also may a chlorine or bromine atom.

As said already the new dyestuffs dye cotton in Bordeaux shades. They also dye viscose and natural silk in similar shades. The dyeings are characterised by great brilliance and tinctorial power. They are also remarkably fast to wet treatments and to light.

The invention is illustrated but not limited by the following examples in which parts are by weight:

Example 1

A mixture of 23 parts of 5-amino-1:4-dibenzoylaminoanthraquinone, 18 parts of 1-nitroanthraquinone-2-carboxylic acid chloride and 400 parts of dry nitrobenzene is heated at 180° C. for 2-3 hours. The mixture is then cooled, filtered and washed with benzene and then with ethanol. It is then dried. The 1:4-dibenzoylamino-5-(1-nitroanthraquinone -2- carboxylamino) - anthraquinone so obtained dyes vegetable fibres in strong Bordeaux shades from a deep red-brown caustic soda-sodium hydrosulphite vat, the dyeings being fast to boiling with alkali and to chlorine.

If desired, the nitro group in the above product may be converted to an amino group before the product is used as a dyestuff. This can be done for example by heating a suspension of the nitro-compound in 10 parts of nitrobenzene at 185–190° C. and passing ammonia gas through the mixture, for 2–3 hours. Alternatively the amino compound may be obtained by heating a mixture of 92 parts of 5-amino-1:4-dibenzoylaminoanthraquinone, 65 parts of 1-aminoanthraquinone-2-carboxylic acid chloride and 1200 parts of dry nitrobenzene for 3 hours at 190° C. The 1:4-dibenzoylamino - 5 - (1-aminoanthraquinone- 2-carboxylamino)-anthraquinone is isolated by filtration at 60° C. and washing first with nitrobenzene, then with benzene and then finally with ethanol. It dissolves in concentrated sulphuric acid to give a clear green solution.

Example 2

A mixture of 50 parts of 5-amino-1:4-di-p-methane - sulphonylbenzoylaminoanthraquinone, 30 parts of 1-nitroanthraquinone-2-carboxylic acid chloride and 1000 parts of dry o-dichlorobenzene is stirred and heated at 180° C. for about 3 hours. It is then cooled to 60° C. and filtered the residue being washed with o-dichlorobenzene and then with benzene and dried. The product so obtained is suspended in 1500 parts of dry nitrobenzene and the suspension is heated at 185-190° C. for 90 minutes while a stream of ammonia is passed through it. The solution so obtained is cooled and the solid which separates is filtered off, washed with ethanol and dried. It dissolves in concentrated sulphuric acid to give a red-brown solution and it dyes vegetable fibres from an olive-green vat in bright red-violet shades.

Example 3

A mixture of 98 parts of 5-amino-1:4-di-p-toluylaminoanthraquinone, 70 parts of 1-nitroanthraquinone-2-carboxylic acid chloride and 1400 parts of dry o-dichlorobenzene is stirred at 180° C. for 8 hours. The product is filtered off, washed with o-dichlorobenzene, benzene and then ethanol and dried. It dissolves in concentrated sulphuric acid to give a yellow-green solution and dyes cotton in shades which are very slightly yellower than those given by the dyestuff described in Example 1.

In a similar manner, dyestuffs with closely similar dyeing properties may be prepared from 5-amino-1:4-dianisylamino-, 5-amino -1:4- di-p - chlorobenzoylamino-, and 5-amino-1:4-di-m - methanesulphonylbenzoylaminoanthraquinones. These intermediates are prepared by acylating 5-nitro-1:4-diaminoanthraquinone with the corresponding acid chlorides in a solvent such as o-dichlorobenzene at about 140° C., and then reducing the nitro group by means of sodium sulphide or sodium hydrosulphite.

We claim:

1. The vat dyes of the formula:

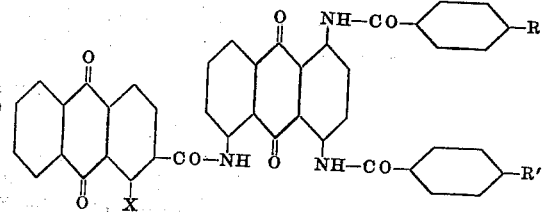

wherein R and R' stand for substituents of the group consisting of —H, —SO$_2$CH$_3$, —OCH$_3$, and —CH$_3$ and wherein X stands for a substituent of the group consisting of —NO$_2$ and —NH$_2$.

2. The vat dye of the formula:

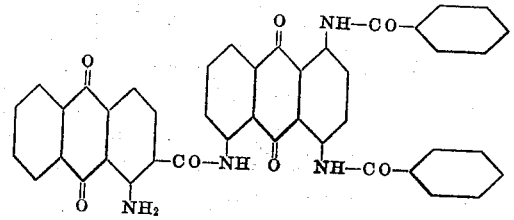

FRANCIS IRVING.
ALISTAIR LIVINGSTON.

REFERENCES CITED

The following references are of record in the file of this patent:

UNITED STATES PATENTS

| Number | Name | Date |
| --- | --- | --- |
| 1,539,689 | Nawiasky et al. | May 26, 1925 |
| 2,179,552 | Graham | Nov. 14, 1939 |
| 2,346,726 | Buxbaum | Apr. 18, 1944 |

FOREIGN PATENTS

| Number | Country | Date |
| --- | --- | --- |
| 465,769 | Great Britain | May 14, 1937 |
| 542,801 | Germany | Feb. 3, 1932 |